March 6, 1962 A. H. FAULKNER 3,024,315

SENDER APPARATUS FOR A TELEPHONE SYSTEM

Filed Aug. 1, 1956 2 Sheets-Sheet 1

INVENTOR.
Alfred H. Faulkner
BY
Smith, Olsen, Baird and Miller
Attys

INVENTOR.
Alfred H. Faulkner
BY
Smith, Olsen, Baird and Miller
Attys.

3,024,315
Patented Mar. 6, 1962

3,024,315

SENDER APPARATUS FOR A TELEPHONE SYSTEM

Alfred H. Faulkner, Chicago, Ill., assignor to Automatic Electric Laboratories, Inc., a corporation of Delaware Filed Aug. 1, 1956, Ser. No. 601,465
6 Claims. (Cl. 179—18)

The present invention relates to automatic telephone systems including therein register-sender apparatus and, more particularly, to the sender apparatus thereof.

A general object of the present invention is to provide in a telephone system sender apparatus of improved structure and arrangement.

A more specific object of the invention is to provide an improved sender apparatus including a counting chain initially controllable for registering therein a digit and controllable thereafter from a switching control source for stepping the counting chain to erase any registration therein.

A further object of the invention is to provide an improved sender arrangement including a counting chain for registering a digit to be sent and an improved pulse generator circuit for conjointly transmitting digit impulses to an output circuit and switching control pulses to the counting chain.

A further object of the invention is to provide an improved sender arrangement including a counting chain to register and count digits, a pulse generator for providing counting pulses and a control circuit for controlling initial operation of the counting chain and for then controlling operation of the pulse generator wherein operation of the pulse generator is terminated when the counting chain is restored to a normal condition.

An additional object of the invention is to provide an improved sender arrangement including a counting chain provided with units of the bistable type for registering digits by operating the units in combinations of the bistable states and a pulse generator for providing switching control pulses thereto and a control circuit selectively responsive to all of the units in the counting chain being switched into one of the bistable states for terminating operation of the pulse generator.

An additional object of the invention is to provide an improved sender arrangement of the type described utilizing semi-conductors and diodes to perform the registering, counting and control operations therein.

Further features of the invention pertain to the particular arrangement of circuit elements in the sending apparatus of the telephone system, whereby the above outlined objects and additional operating features thereof are attained.

Figure 1:
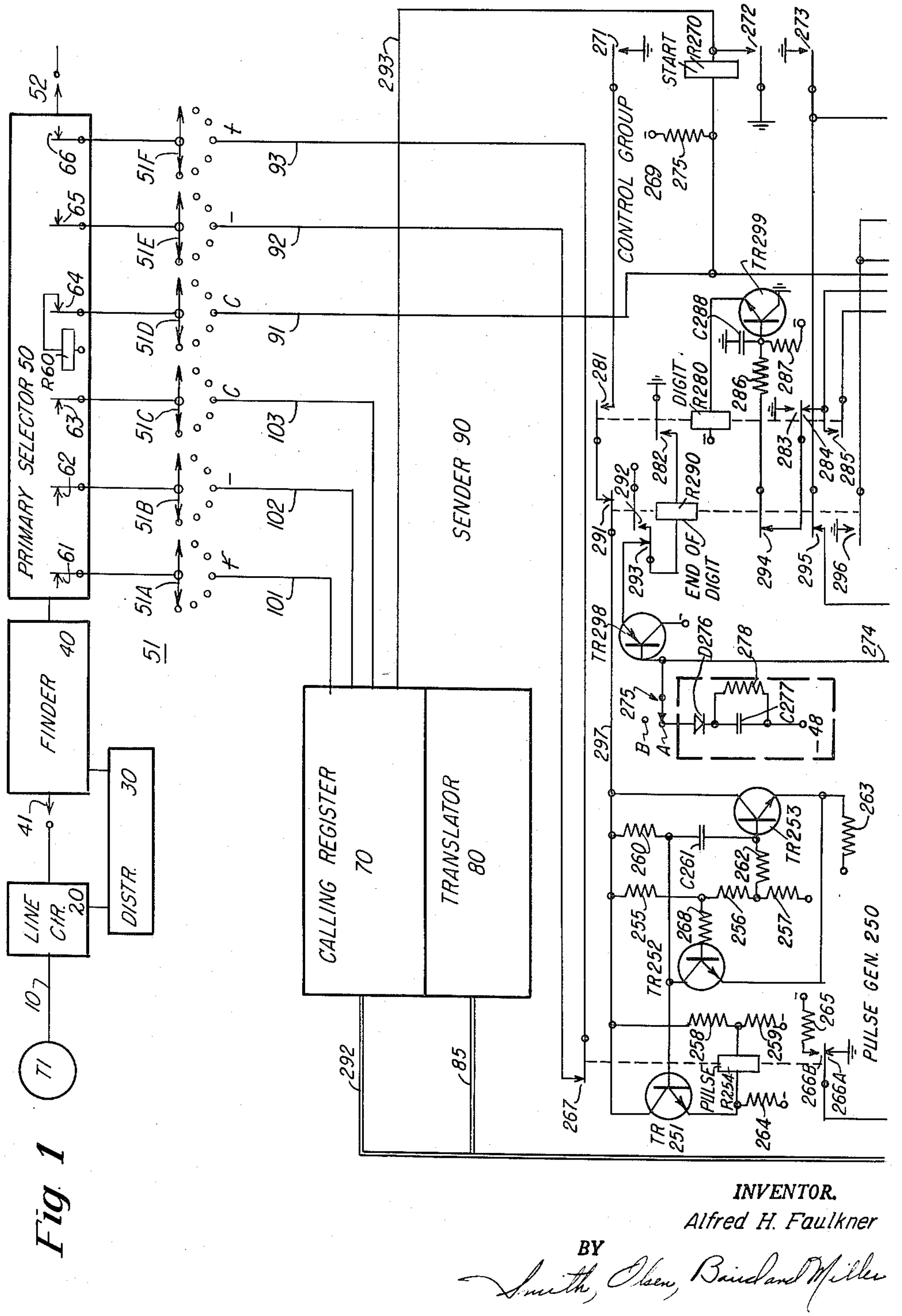
Figure 2:
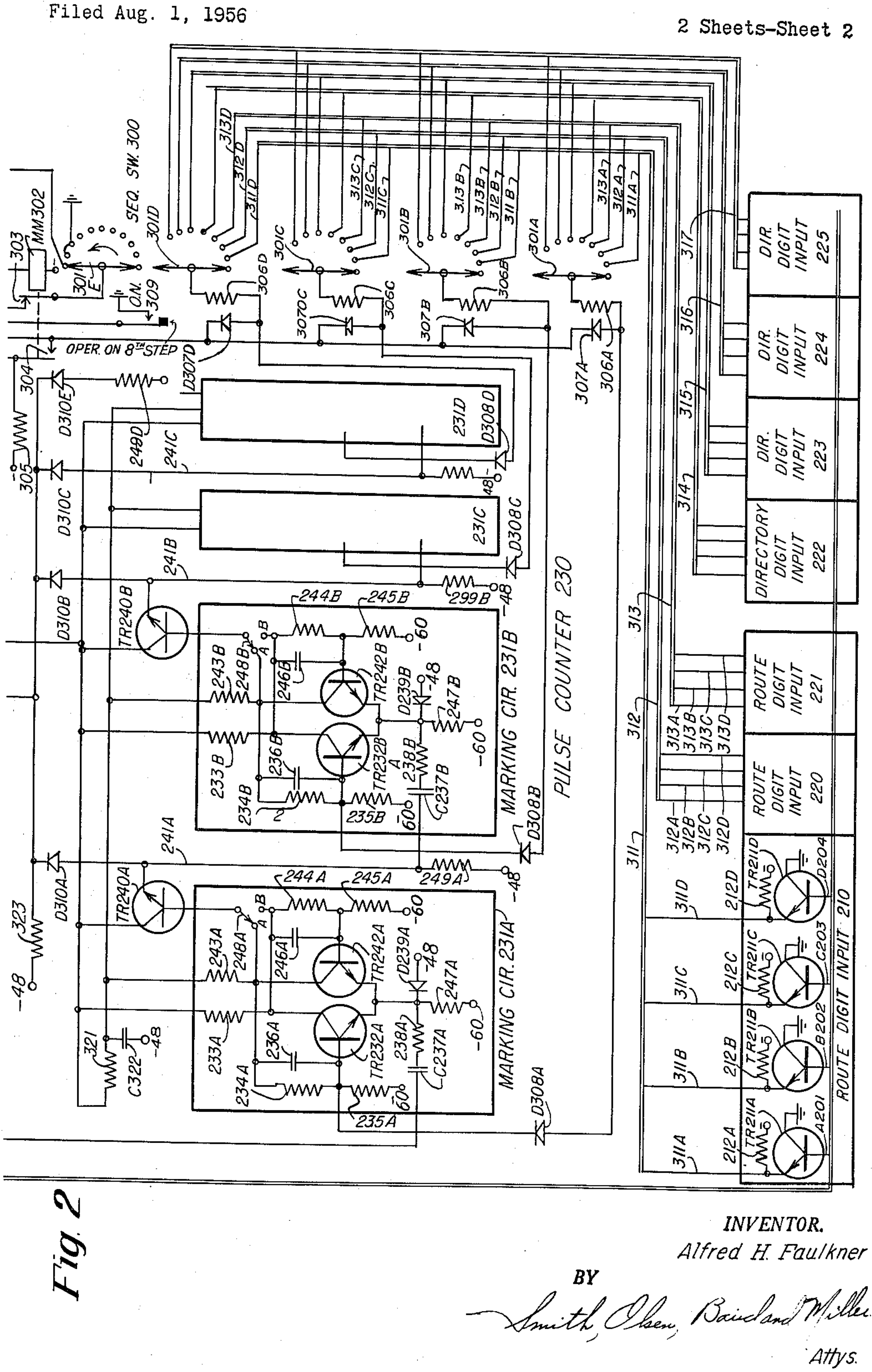

The invention both as to its organization and method of operation, together with the further objects and advantages thereof, will be best understood by reference to the following specification taken in conjunction with the accompanying drawings, in which FIGURES 1 and 2, taken together, illustrate the telephone apparatus of the calling office including the sending apparatus in accordance with the invention.

Referring specifically to FIGURES 1 and 2, the calling office, as illustrated, serves a plurality of subscriber lines including the subscriber line 10, extending to the subscriber station T1. The calling office also comprises a plurality of line circuits respectively terminating the subscriber line and includes the line circuit 20 terminating the subscriber line 10. In addition, the office comprises a distributor 30, operatively connected to the line circuits therein and to a plurality of finder-primary selector groups. The finder-primary selector group illustrated includes the finder 40 and the primary selector 50, of which the finder 40 includes a wiper set 41 having access to the line circuits 20, etc., and, the primary selector 50 includes a wiper set 51 having access to a plurality of register-translator-sender groups and includes a wiper set 52 having access to trunks extending to distant telephone offices. The wiper sets 41 and 52 may be of the Strowger type, whereas the wiper set 51 may be of the conventional rotary type. In addition, the primary selector 50 includes a release relay R60 which is operable over the wipers of the wiper set 51.

Referring specifically to the primary selector 50, the apparatus included therein is of a conventional arrangement and is adapted to receive digits from the calling subscriber station, to transfer these digits to an idle register-translator-sender group, to receive therefrom control signals for operating the wiper set 52 thereof in order to select an outgoing trunk, and to transmit thereover further control signals for operating switching apparatus in order to extend a connection to the called subscriber station in the distant office. Thereafter, the register-translator-sender group is released from the primary selector 50 and the calling subscriber station is connected through the primary selector to the called subscriber station. The wiper set 51 of the primary selector 50 includes, as illustrated, the wipers 51A, 51B, 51C, 51D, 51E and 51F, operable from the primary selector 50 to rotate step-by-step in a counterclockwise direction across associated contacts in order to select over the wiper 51C an idle register-translator-sender group and to transmit digits thereto over the wipers 51A and 51B and to receive switching control signals therefrom over the wipers 51E and 51F and to receive a release control therefrom over the wiper 51D for operating the release relay R60 therein.

Each of the register-translator-sender groups comprise a calling register 70, a translator 80, and a sender 90. The calling register 70 is preferably of a type such as that disclosed in the copending application to Alfred H. Faulkner, Serial No. 601,468, filed August 1, 1956, now Patent No. 2,882,345 including a group of office code registers for registering the office code digits identifying the distant called office and for marking the registered digits to the translator 80, and including a group of directory number registers for registering the directory number digits identifying the called subscriber station in the called distant office and for marking the registered directory number digits directly to the sender 90 via a trunk 292.

The translator 80 may be of a type such as that disclosed in the copending application to Alfred H. Faulkner, Serial No. 601,467, filed August 1, 1956, now Patent No. 2,876,289 whereof the office code digits marked thereto from the calling register 70 are translated therein to routing digits and marked to the sender 90 via a trunk 85.

The sender 90 includes a group of route digit input circuits 210, 220, and 221, a group of directory digit input circuits 222, 223, 224 and 225, a pulse counter 230, a pulse generator 250, and a control group 269 including a start relay R270, a digit relay R280 and an end-of-digit relay R290. The route digit input circuits and the directory digit input circuits are identical in structure each including four transistors respectively identified in the route digit input circuit 210 as TR211A, TR211B, TR211C, and TR211D, whereof the route digit input circuits 210, etc., are connected via the trunk 85 to the translator 80 and are selectively controlled thereover, and the directory digit circuits 222, etc., are connected via the trunk 292 to the calling register 70 and are selectively controlled thereover.

The pulse counter 230 includes the marking circuits 231A, 231B, 231C and 231D, simultaneously controllable over any one of the connections completeable via the wipers of a sequence switch 300 to the group digit input circuits 210, etc., and to the directory digit input circuit 222, etc. Specifically, the sequence switch 300 is of the rotary type and includes the wipers 301A, 301B, 301C, 301D and 301E, and the motor magnet MM302, whereof the wiper 301A is individually associated with the marking circuit 231A, the wiper 301B is individually associated with the marking circuit 231B, the wiper 301C is individually associated with the marking circuit 231C and the wiper 301B is individually associated with the marking circuit 231B, and the wiper 301E is associated with a control switch for returning the wipers to their home position. The motor magnet MM302 is controllable for stepping the wipers 301A, etc., successively in a counterclockwise direction to make contact with the contacts thereof having access to the digit input circuits 210, etc. The markings circuits 231A, etc., are connected in chain for binary operation whereof the marking circuits are of identical bistable multivibrator structure, and there is included in each a pair of transistors, which in the marking circuit 231A are identified as TR232A and TR242A. The output from the marking circuit 231A is applied via an output transistor TR240A to a control conductor 241A extending to the marking circuit 231B and to a diode D310A extending further to a transistor TR298 in the control group 269. Similarly, the marking circuit 231B is connected via an output transistor TR240B to a control conductor 241B extending to the marking circuit 231C and to a diode D310B extending further to the transistor TR298 in the control group 269; the marking circuit 231C is connected via a transistor TR240C (not shown) to a control conductor 241C extending to the marking circuit 231B and to a diode D310C extending to the transistor TR298 in the control group 269; and the marking circuit 231D is connected via transistor TR240D (not shown) to a diode D310D extending to the transistor TR298 in the control group 269. The sequence switch 300 includes the double wipers 301A, 301B, 301C and 301D, respectively associated with the marking circuit 231A, 231B, 231C and 231D, a control wiper 301E and a motor magnet MM302, for operating each of the individual wipers step-by-step across the associated contact bank in a counterclockwise direction from a home position contact. A group of trunks 311, 312 and 313 connect the route digit input circuits 210, 220 and 221, respectively, to individual contacts in the contact bank of the sequence switch 300; and a group of trunks 314, 315, 316 and 317 connect the directory digit input circuits 222, 223, 224 and 225, respectively, to individual contacts in the contact bank of the sequence switch 300; whereby when the wipers 301A, 301B, 301C and 301D of the sequence switch 300 are stepped from their home position into engagement with the first contacts in the contact bank, the route digit input circuit 210 is connected to the marking circuits 231A, 231B, 231C and 231D, and the other route digit input circuits and directory digit input circuits are connected individually and sequentially to the marking circuit as the control wipers are stepped further in the counterclockwise direction. In addition, the control wiper 301E has associated therewith an off-normal switch 309 which is closed when the wiper engages the eighth contact in the associated contact bank and is opened again when the wiper is stepped into home position; whereby a control operation is performed as is described hereinafter.

The pulse generator 250 includes the transistors TR251, TR252 and TR253 and the pulse relay R254. Operation of the pulse generator 250 is controlled from the control group 269 and upon operating applies switching control pulses to the pulse counter 230 for switching the marking circuits 231A, etc., thereof between their stable states.

The control group 269 is operated over a conductor 293 connected to the calling register 70, in response to ground potential being applied thereto at the completion of the registration of all of the office code and the directory number digits therein, as described in detail in the copending application to Alfred H. Faulkner, Serial No. 601,468, filed August 1, 1956, now Patent No. 2,882,345.

The operation of the sender 90 in accordance with the invention will be better understood by considering the initiation of a call at the subscriber station T1 to be extended to a subscriber station in a distant office, and cooperating operation of the sender 90 in the disposal of that call.

Now, assuming that a call is initiated at the subscriber station T1 to be extended to a subscriber station in a distant exchange, the line circuit 20 is operated to mark the subscriber line 10 as calling to the finder-selector groups having access thereto and to mark the subscriber line 10 as busy to the connectors having access thereto. Additionally, the line circuit 20 operates the distributor 30 to cause a finder in the idle finder-selector group, for example, the finder 40, to locate the subscriber line 10 marked as calling thereto. At the same time the finder 40 is operated by the distributor 30, the primary selector 50 associated therewith operates to cause the wiper set 51 to complete a connection to an idle register-translator-sender group. Specifically, the wiper 51C is rotated step-by-step in a counterclockwise direction over its associated contacts until it completes a connection to a conductor having battery potential thereon. Assuming that the conductor 103 is the first control conductor having battery potential marked thereon, the wiper 51C engages the contact terminating the control conductor 103 and the other wipers 51A, etc., of the wiper set 51 complete connections to the corresponding contacts thereof. When the finder 40 seizes the calling subscriber line 10, a connection is completed from the subscriber station T1 through the finder 40 and the primary selector 50 to the calling register 70 whereby the calling register is activated and dial tone is returned to the calling station T1.

Thereafter, the party at the calling subscriber station T1 receives dial tone and proceeds to dial the called number. For purposes of illustration, it is assumed that the calling number is composed of seven (7) digits of which the first three (3) digits are the office code digits identifying the distant office in which the called subscriber station is located, and the last four (4) digits are the directory number digits identifying the subscriber station in the called office. Now, assuming that the party at the calling station T1 dials a number of which the first three digits (the office code digits) are "137," and the last four digits (the directory number digits) are "1234," the calling register 70 is operated in a manner as described in the copending Faulkner application, Serial No. 601,468, filed August 1, 1956, to register the digits "137" in the office code register thereof, and, to register the digits "1234" in the directory number register thereof and to mark the registered office code digits to the translator 80 and to mark the registered directory number digits via the trunk 292 to the directory digit input circuits 222, etc., in the sender 90. In the translator 80 the office code digits marked thereto are translated to a corresponding set of routing digits which are applied via the trunk 85 to the route digit input circuits 210, etc. in the sender 90. Assuming now that the translator 80 operates as described in the copending Faulkner application, Serial No. 601,467, filed August 1, 1956, to translate the office code digits "137" to the routing digits "231," the sender 90 will then have the digit "2" marked to the route digit input circuit 210, the digit "3" marked to the route digit input circuit 220, the digit "1" marked to the route digit input circuit 221, the digit "1" marked to the directory digit input circuit 222, the digit "2" marked to the directory digit input circuit 223, the digit "3" marked to the directory digit input circuit 224, and the digit "4" marked to the directory digit input circuit 225, each digit being marked over an individually associated group of four conductors on a binary basis in accordance with the voltages outlined in the following table:

*Table 1*

| Digit value | Marking voltages | | | |
|---|---|---|---|---|
| | Conductor A | Conductor B | Conductor C | Conductor D |
| 1 | 0 | −48 | −48 | −48 |
| 2 | −48 | 0 | −48 | −48 |
| 3 | 0 | 0 | −48 | −48 |
| 4 | −48 | −48 | 0 | −48 |
| 5 | 0 | −48 | 0 | −48 |
| 6 | −48 | 0 | 0 | −48 |
| 7 | 0 | 0 | 0 | −48 |
| 8 | −48 | −48 | −48 | 0 |
| 9 | 0 | −48 | −48 | 0 |
| 0 | −48 | 0 | −48 | 0 |

Accordingly, in the route digit input circuit 210 the conductor 201 has −48 volts applied thereto, the conductor 202 has ground potential applied thereto, the conductor 203 has −48 volts applied thereto, and the conductor 204 has −48 volts applied thereto, thereby registering the digit "2." To further illustrate the marking of the digits to the digit input circuits and assuming for a moment that the digit "7" is marked to the route digit input circuit 210, the conductors 201, 202 and 203 thereof would be marked at ground potential and the conductor 204 would be marked at −48 volts. In this manner the digits translated in the translator 80 are marked to the route digit input circuits 210, etc., and the digits registered and the directory number digits registered in the calling register 70 are marked to the directory digit input circuits 222, etc.

Each of the route digit input circuits 210, etc., and directory digit input circuits 222, etc., are identical in structure to one another and include a set of four transistors corresponding to the four marking conductors extended thereto whereof each transistor is connected in a cathode-follower type of circuit for retransmitting the voltage on the corresponding marking conductor to the pulse counter. By way of specific example the route digit input circuit 210 includes the transistors TR211A, TR211B, TR211C and TR211D of which the collector electrodes are connected to ground potential, the emitter electrodes are connected to −48 volts via the resistors 212A, 212B, 212C and 212D, respectively, and the base electrodes are connected to the conductors 201, 202, 203 and 204 respectively, so that −48 volts on any one of the conductors 201, etc. causes the emitter electrode of the corresponding transistor TR211A, etc., to be maintained at −48 volts and ground potential on any one of the conductors 201, etc. causes the emitter electrode of the corresponding transistor TR211A, etc. to be established at ground potential. Additionally, the emitter electrodes of transistors in each of the input circuits are connected further to individual conductors in the associated trunk extending to the contact bank in the sequence switch 300 for transmitting to the contacts the potential on the connected emitter electrode. Thus in the route digit input circuit 210 the emitter of TR211A is connected via a conductor 311A of the trunk 311 to the first contact of the contact set associated with the wiper 301A, the emitter of TR211B is connected via a conductor 311B of the trunk 311 to the first contact of the contact set associated with the wiper 301B, a conductor 311C connects the emitter of TR211C to the first contact of the contact set associated with the wiper 301C, and a conductor 311D connects the emitter of TR211D to the first contact of the contact set associated with the wiper 301D. In the route digit input circuit 220 the conductors 312A, 312B, 312C and 312D connect the emitter electrodes of the transistors therein (not shown) to the second contacts of the contact sets associated respectively with the wipers 301A, 301B, 301C and 301D; and in the route digit input circuit 221 the conductors 313A, 313B, 313C and 313D connect the emitter electrodes of the transistors therein (not shown) to the third contacts of the contact sets associated respectively with the wipers 301A, 301B, 301C and 301D.

Accordingly, as the route digit input circuit 210 has the digit "2" marked thereto over the conductors 201, 202, 203 and 204 by voltage in conformance with those listed in Table I the conductors 311A, 311C and 311D are at battery potential and the conductor 311B is at ground potential whereby the respectively connected first contacts of the contact bank in the sequence switch 300 are marked at the same potentials. Similarly, in the route digit input circuit 220, the conductors 312A and 312B are marked at ground potential and the conductors 312C and 312D are marked at battery potential, thereby marking to the respectively connected second contacts of the contact bank of the sequence switch 300, the second routing digit "3"; and in the route digit input circuit 221 the conductor 312A is marked at ground potential and the conductors 313B, 313C and 313D are marked at battery potential thereby marking to the respectively connected third contacts of the contact bank of the sequence switch 300, the third routing digit "1." Similarly, the fourth, fifth, sixth and seventh contacts in each of the contact sets associated with the control wipers 301A of the sequence switch 300 are marked over the conductors of the respectively associated trunks 314, 315, 316 and 317, in accordance with the directory numbers of the called station. At this time the markings on the contacts of the contact bank in the sequence switch 300 are of no effect in the pulse counter 230 because the control wipers 301A, etc., are in their home contact position. However, after the last directory number digit has been registered in the calling register 70 and extended to the sender 90 and therein marked to the contacts of the sequence switch 300, ground potential is applied to the conductor 293 extending from the calling register 70, in a manner as is explained in the copending Faulkner application, Serial No. 601,468, filed August 1, 1956, whereby the control group 269 is operated in a manner as explained hereinafter to activate the pulse counter 230 and to cause the wipers of the sequence switch 300 to engage the first contacts.

Ground potential applied to the conductor 293 is extended to the sender 90 wherein a circuit is completed via the winding of the start relay R270 and a resistor 275 to battery potential for operating the relay R270. Upon operating the relay R270 prepares at contacts 271 a circuit for operating the pulse generator 250, closes at contacts 272 a hold circuit thereto from ground potential and closes at contacts 273 a circuit for operating the sequence switch 300 and a circuit for operating the marking circuits 231A, etc., of the pulse counter 230. Specifically, upon closing the contacts 273 apply ground potential via the home contact of the contact set associated with the wiper 301E, the wiper 301E, contacts 303, and the winding of the motor magnet MM302 to battery potential, whereby the motor magnet MM302 is energized. Thereupon, the motor magnet MM302 interrupts at contacts 303 the previously traced circuit whereby the control wipers 301A, etc., are stepped in a counterclockwise direction from their home contacts to engage the first contact in the individually associated contact sets. During the short time interval that the motor magnet MM302 operates to step the wipers from their home contact position into engagement with their first contact, the marking circuits 231A, etc., are simultaneously operated over a circuit extending from ground potential applied at the contacts 273 so that when the wipers 301A, etc., finally engage the first contacts associated therewith, the marking circuits are prepared to respond to the marking potential thereon.

Specifically, in the marking circuits, and referring in particular to the marking circuit 231A in order to illustrate the initiating operation that takes place in all of the marking circuits, ground potential applied at the contacts 273 is extended via the contacts 295 to a resistor 233A in the marking circuit 231A and therethrough to a junction between the collector electrode of the transistor TR232A and a voltage divider including the resistors 244A and 245A extending to −60 volts. The base electrode of the transistor TR242A in the marking circuit 231A is connected to the junction between the resistors 244A and 245A, and the values of the resistors 233A, 244A and 145A are chosen so that at this time the voltage applied to the collector electrode of the transistor TR232A is at substantially ground potential and the voltage at the base electrode of the transistor TR242A is intermediate between −48 volts and ground potential. At the same time, ground potential applied at the contacts 273 is extended via the contacts 295 and a resistor 321 to a junction between a capacitor C322 extending to −48 volts and a resistor 243A located in the marking circuit 231A. The resistor 243A is connected in the marking circuit to the junction between the collector electrode of the transistor TR242A and a voltage divider including the resistor 234A and 235A extending to −60 volts; whereby at this time and due to the charging current drawn through resistor 321 by the capacitor C322, the voltage established via the resistor 243A at the collector electrode of the transistor TR242A is substantially −48 volts and the potential established on the base electrode of the transistor TR232A, connected to the junction between the resistors 234A and 235A, is intermediate between −48 volts and −60 volts. The emitter electrodes of the transistors TR232A and TR242A are connected to a junction between a diode D239A extending to −48 volts and a resistor 247A extending to −60 volts so that the voltage at these emitters is substantially −48 volts. Accordingly, the transistor TR242A is biased conductive in its base-emitter path and the transistor TR232A is biased nonconductive in its collector-base path; a heavy current is drawn through the collector-emitter path of the transistor TR242A thereby establishing the collector electrode thereof at substantially −48 volts and maintaining the transistor TR232A nonconductive with ground potential on the colletcor electrode thereof.

In the pulse counter 230, marking control operation is facilitated in each of the marking circuits 231A, etc., as facilitated in the marking circuit 231A, wherein marking potentials applied via the associated control wiper 301A of the sequence switch 300 are received at the junction between the resistors 234A, 235A and the base electrode of the transistor TR232A. Additionally, stepping control operation is facilitated in each of the marking circuits of the pulse counter 230 as facilitated in the marking circuit 231A wherein stepping control pulses applied thereto are received via a capacitor C237A and a resistor 238A connected to the junction between the diode D239A, the resistor 247A and the emitters of the transistors TR232A and TR242A. As previously pointed out, the output transistors TR240A, etc., are utilized in the marking circuits 231A, 231B and 231C and 231D to provide an input control to the control group 269 and to provide stepping control pulses to the next succeeding marking circuit to the pulse counting chain. Thus, in the marking circuit 231A, an output transistor TR240A is connected in a cathode follower type circuit whereof the collector electrode is connected to ground potential via the contacts 295 and 273; the emitter electrode is connected to the control conductor 241A extending jointly to the stepping control input of the marking circuit 231B, to the resistor 249A extending to −48 volts, and to the diode D310A extending via a resistor 323 to −48 volts; and the base electrode is connected in the marking circuit 231A via a two-position switch 248A and the contacts "A" thereof to the collector electrode of the transistor TR242A. As the collector electrode of the transistor TR242A is at substantially −48 volts at this time, the transistor TR240A is biased non-conductive in the collector-base path thereof and the emitter electrode is at −48 volts.

Thus, in response to the closing of ground potential at contacts 273, the pulse counter 230 is operated so that the marking circuits 231A, etc., thereof, the transistors TR242A, TR242B, TR242C (not shown) and TR242D (not shown) are biased conductive and the transistors TR232A, TR232B, TR232C (not shown) and TR232D (not shown) are biased non-conductive, and so that the output transistors TR240A, TR240B, TR240C (not shown) and TR240D (not shown) are biased non-conductive. At this time the marking circuits are ready to be operated in accordance with the marking potentials applied to the marking control inputs thereof. A short time thereafter, the wipers 301A, 301B, 301C and 301D of the sequence switch 300 engage the individually associated first contacts of the contact bank whereby the marking potentials on the marking conductors 311A, 311B, 311C, and 311D support further operation of the control group 269 and of the marking circuits 231A, etc., of the pulse counter 230 in a manner as is explained in detail hereinafter.

Considering now the operating state of the control group 269 prior to the engagement of the control wipers of the sequence switch 300 with the first contacts of the associated contact banks, it is recalled that the start relay R270 upon operating closed ground at contacts 271, thereby preparing a circuit for operating the pulse generator 250. Additionally, the transistor TR299 thereof which is connected in a cathode-follower type circuit, having its collector electrode connected to ground potential, and its emitter electrode connected to negative battery via the winding of the digit relay R280, is biased non-conductive in its collector-base path by −48 volts on the base electrode thereof, which base electrode is connected to the junction between a resistor 287 and a capacitor C288 extending between negative battery and ground potential. Further, the operating circuit for the transistor TR298 is incomplete at this time, whereby TR298 is non-conductive.

Reconsidering for a moment, the digits marked to the contact banks of the sequence switch 300, it is recalled that the digit "2" is marked in the route digit input circuit 210 whereby, of the conductors 311A, 311B, 311C and 311D, extending therefrom to the first contacts in the contact bank of the sequence switch 300, the conductors 311A, 311C and 311D are marked with −48 volts and the conductor 311B is marked with ground potential. Accordingly, when the control wipers of the sequence switch 300 engage the first contacts of the contact bank, −48 volts is extended via the control wiper 301A and a resistor 306A to a junction between a diode D308A extending to the marking control input of the marking circuit 231A, and a diode D307A extending to the control group 269. As the junction between the resistors 234A and 235A and the base electrode of the nonconductive transistor TR232A, receiving the diode D308A, is at this time maintained at a voltage intermediate between −48 volts and −60 volts, the diode D308A is substantially nonconductive and the state of the marking circuit 231A is not affected. Similarly, −48 volts on the marking conductor 311C extended via the control wiper 301C of the sequence switch 300 and a resistor 306C to the diode D308C associated with the marking circuit 231C, does not affect the state of the marking circuit 231C; and —48 volts on the marking conductor 311D and extended via the control wiper 301D of the sequence switch 300 and a resistor 306D to a diode D308D associated with the marking circuit 231D, does not affect the state of the last named marking circuit. However, ground potential on the marking conductor 311B is extended via the control wiper of 301B of the sequence switch 300, a resistor 306B and a diode D308B to the base electrode of the transistor TR232B in the marking circuit 231B, which transistor is at this time biased nonconductive with its collector electrode at substantially ground potential and its base electrode intermediate between —48 volts and —60 volts. Ground potential applied to the base electrode thereof biases the transistor TR232B conductive in its base-emitter path thereby causing the voltage on the collector electrode thereof to drop to —48 volts. Ground potential on the base electrode of TR232B and —48 volts on the emitter electrode thereof has an accumulative effect in rendering the heretofore conductive transistor TR242B nonconductive in that the change in voltage on the base electrode of TR232B from —48 volts to ground potential is transferred via a capacitor C236B to the collector electrode of the transistor TR242B which was at substantially —48 volts and is now driven to approximately ground potential, and the change in voltage on the collector of the transistor TR232B from ground potential to —48 volts is transferred via a capacitor C246B to the base electrode of the transistor TR242B, which was at a voltage intermediate between ground potential and —48 volts and is now driven to a voltage somewhat negative with respect to —60 volts; accordingly, the transistor TR242B is cut off and the base electrode thereof is established at a voltage intermediate between —60 volts and —48 volts and the collector electrode thereof is established at substantially ground potential via the resistor 243B. Ground potential on the collector electrode of the transistor TR242B is extended via contacts "A" of the switch 248B to the base electrode of the transistor TR240B, whereby TR240B is made conductive and the emitter electrode tends to follow, thereby raising the voltage on the control conductor 241B to ground potential. However, the conductor 241B is connected via a diode D310B to the junction between the resistor 323 extending to —48 volts and a conductor 274 connected jointly to the base electrode of the transistor TR298 and a switch 275 extending via contacts "A" thereof, a diode D276, and a parallel capacitor and resistor arrangement including the capacitor C277 and a resistor 278 to —48 volts, whereby the heretofore discharged capacitor C277 charges slowly to ground potential and the voltage on the conductor 241B rises slowly from —48 volts to ground potential during the charging period. Accordingly, the change in the voltage on the conductor 241B is not abrupt and therefore is not transmitted through the stepping control input of the marking circuit 231C; whereby the operating state of the marking circuit is not changed. Thus, in response to the control wipers 301A, etc. of the sequence switch 300 engaging the first contacts in the contact bank having the digit "2" marked thereto, the pulse counter 230 is operated so that in the marking circuits 231A, 231C and 231D, the transistors TR242A, TR242C (not shown) and TR242D (not shown) are conductive and the transistors TR232A, TR232C (not shown) and TR232D (not shown) are biased nonconductive, and so that in the marking circuit 231B the transistor TR232B is conductive and the transistor TR242B is nonconductive. Accordingly, the transistors TR240A, TR240C (not shown) and TR242D (not shown) are nonconductive, and the transistor TR240B is conductive. And a short time thereafter, as determined by the charging period of the capacitor C277, the base electrode of the transistor TR298 in the control group 269 is established at ground potential.

At the same time, ground potential on the conductor 311B is extended via the control wiper 301B and the resistor 306B through the diode D307B to the control group 269, wherein a circuit is completed via contacts 284 and 294 and a resistor 286 for extending ground potential to the junction between the capacitor C288, the base electrode of the transistor TR299 and the resistor 287, which junction is at this time established as substantially —48 volts. Thereupon the capacitor C288 begins to discharge to ground potential and a short time thereafter, when C288 is discharged, the transistor TR299 is rendered conductive thereby establishing the emitter electrode thereof at substantially ground potential, whereby the digit relay R280 is energized and operated. Upon operating, the relay R280 completes at contacts 281 the previously prepared circuit extending from ground potential to the input conductor 297 of the pulse generator 250, and including the contacts 271 and 291; completes at contacts 282 a circuit extending from ground potential via the winding of the end-of-digit relay R290 and contacts 293 to the emitter electrode of the transistor TR298, which transistor is not operative at this time inasmuch as it is biased non-conductive in the base-emitter path by ground potential on the base electrode thereof. Accordingly, the end-of-digit relay R290 is not operated at this time. Further, the relay R280 upon operating closes at contacts 283 ground potential for maintaining the base electrode of the transistor TR299 conductive, opens at contacts 284 the previously traced circuit from the sequence switch 300 to the base electrode of the transistor TR299, and completes at contacts 285 a circuit extending from negative battery via a resistor 305 to the diodes D307A, etc., for biasing these diodes nonconductive. Accordingly, at this time, the pulse generator 250 is operated and begins to send pulses to the primary selector 50 at regular intervals until stopped thereafter by the control group 269 in a manner as is described in detail hereinafter.

In the pulse generator 250, ground applied to the input conductor 297 thereof is extended via a voltage divider including resistors 255, 256 and 257 to battery potential, wherein the voltage established at the junction between resistors 255 and 256 is approximately —25 volts and the voltage established at the junction between the resistors 256 and 257 is approximately —30 volts; additionally, ground is extended from the conductor 297 via resistors 258 and 259 to negative battery potential wherein the voltage at the junction therebetween is approximately —35 volts. A capacitor C261 is connected through a resistor 260 to ground potential on the conductor 297 and is connected through a resistor 262 to —30 volts at the junction between resistors 256 and 257, and the values of the resistors 260 and 262 are chosen so that when the capacitor C261 is discharged, as at the time ground is applied via contacts 271 to the conductor 297, the voltage at the junction between the resistor 262 and the capacitor C261 and at the junction between the resistor 260 and the capacitor C261 is approximately —10 volts; whereby the voltage at the base electrode of the transistor TR253, connected to the former junction, is —10 volts and the voltage at the collector electrode of the transistor TR252, connection to the latter junction, is —10 volts. As the collector electrode of the transistor TR253 is connected to ground potential on the conductor 297 and the emitter electrode is connected to negative battery via a resistor 263, the transistor TR253 is conductive in its base-emitter path and the emitter electrode is established at approximately —10 volts. As the base electrode of the transistor TR252 is connected via a resistor 268 to —25 volts at the junction between the resistors 255 and 256 and the emitter electrode is connected to —10 volts at the junction between the emitter electrode of TR253 and the resistor 263, the transistor TR252 is biased nonconductive in its base-emitter path. Accordingly, the pulse generator 250 is operated in response to the application of ground potential to the conductor 297 to render the transistor TR253 conductive and to bias the transistor TR252 nonconductive and to commence to charge the capacitor C261 located therein. As the capacitor C261 begins to charge the junction between the capacitor C261 and the resistor 260 tends to go from —10 volts to ground potential and the junction between C261 and the resistor 262 and the base electrode of the transistor TR253 tends to go from —10 volts to approximately —30 volts. However, as the voltage on the base electrode of the transistor TR253 goes from —10 volts toward —30 volts, so also does the voltage on the emitter electrode thereof and, accordingly, so also does the voltage on the emitter electrode of the transistor TR252. Thus, when the base electrode of TR253 reaches approximately —25 volts, the emitter electrode of TR252 reaches approximately —25 volts, whereby TR252 is biased conductive in its base-emitter path and conducts current in the collector-emitter path thereof, whereby the collector voltage drops from approximately ground potential to —25 volts thereby causing the voltage at the junction between the capacitor C261 and the resistor 260 and the voltage at the junction between C261 the resistor 262 and the base electrode of TR253 to change by the same amount and in the same direction, whereby the base of TR253 is driven to a voltage somewhat negative with respect to —50 volts. As the emitter electrode of the transistor TR253 is held at approximately —25 volts at this time by the current flowing from the emitter of the transistor TR252 through the resistor 263 to —48 volts, the transistor TR253 is biased nonconductive in its emitter-base path. With the transistor TR253 rendered nonconductive, the voltage at the emitter electrode, and, accordingly, of the collector electrode of the transistor TR252, is determined by the values chosen for the resistors 268 and 263, and in the present example, they are chosen so that the voltage established at the emitter and collector electrodes is approximately —34 volts and —35 volts, respectively. Thus, a short time after ground potential is applied to the conductor 297 of the pulse generator 250, the capacitor C261 thereof charges to a sufficient level so as to reverse the operating state of the transistors TR253 and TR252 whereby the transistor TR252 is rendered conductive and the transistor TR253 is rendered nonconductive. At this time, the voltage at the junction between the capacitor C261 and the resistor 260 is established at approximately —35 volts by the voltage on the collector electrode of TR252 and the voltage at the junction between C261 and the resistor 262 is substantially negative with respect to —48 volts, whereby the capacitor C261 tends to discharge through the resistor 262 to the voltage at the junction between the resistors 256 and 257, or to approximately —30 volts. As the capacitor C261 discharges and raises the voltage at the junction between the capacitor C261, the resistor 262 and the base electrode of the transistor TR253 toward —30 volts, the transistor TR253 is rendered conductive in its base-emitter path when the voltage on the base electrode thereof reaches approximately —34 volts, which is the voltage established on the emitter electrode thereof at the junction between the emitter of TR252 and the resistor 263. As the capacitor C261 continues to discharge the base electrode continues to change from —34 volts toward —30 volts and the emitter follows, whereby, the voltage at the emitter electrode of TR252 tends to increase from —34 volts toward 30 volts and the collector electrode thereof follows. The change in the voltage on the collector electrode of TR252 is applied to the junction of C261 and resistor 260 and applied through C261 to the base electrode of TR253 whereby further regenerative action takes place in the base-emitter path of TR253 and the emitter-collector path of TR252 until, finally, the voltage at the emitter electrode of TR252 reaches approximately —25 volts whereupon conduction in the base-emitter path thereof ceases and the voltage on the collector electrode thereof is determined by the voltage at the junction between C261 and the resistor 260. As the capacitor C261 is substantially discharged at this time, the voltages at the junction between C261 and resistor 260 and the junction between C261 and resistor 262 is determined by the current flowing from ground potential on the conductor 297 through the resistor 260 the capacitor C261 and 262 to —30 volts at the junction between resistors 256 and 257 which, as previously explained, establishes the voltage at the collector electrode of TR252 at approximately —10 volts. Thus, one operational cycle of the pulse generator 250 is completed and the capacitor C261 begins to charge again to render the transistor TR253 nonconductive and the transistor TR252 conductive in a manner as previously explained. Accordingly, the voltage at the collector electrode of TR252 is a substantially rectangular wave, having a maximum voltage of approximately —10 volts and a minimum voltage of approximately —35 volts, whereof the frequency and period is determined by the values chosen for the RC circuits in the pulse generator. This rectangular wave form is applied to the base electrode of the transistor TR251 which is connected in a cathode follower type circuit whereof the collector electrode is connected to ground potential on the conductor 297 and the emitter electrode is connected to battery potential via a resistor 264. The transistor TR251 repeats the voltage wave in a low impedance circuit connected to its emitter electrode without unduly loading the pulse generator. As the emitter electrode is connected through the winding of the pulse relay R254 to the junction to —35 volts at the junction between the resistors 258 and 259, the relay R254 is energized and operated during the period of the wave form when the voltage is substantially —10 volts. The pulse relay R254 upon operating, opens at contacts 266A, a circuit for extending ground potential to the switching control input and, in particular, to the capacitor C237A in the marking circuit 231A, and closes at contacts 266B a circuit including the resistor 265 for discharging the capacitor C237A in the marking circuit 231A to battery potential. At the same time, the relay R254 opens at contact 267 a circuit extending via conductors 92 and 93 and wipers 51E and 51F to the primary selector 50, wherein responsive thereto a first digit impulse is received in the wiper 52 in order to control switching apparatus for extending a call to the distant called exchange. Thereafter, when the voltage at the emitter electrode of the transistor TR251 falls to approximately —25 volts, the relay R254 restores, thereby opening at contacts 266B the previously traced circuit for discharging the capacitor C237A and closes at contacts 266A the circuit for charging the capacitor C237A.

Referring specifically now to the operation of the marking circuits 231A, etc., in the pulse counter 230 in response to the operation of the pulse generator 250, and recalling that at this time in the marking circuit 231A the transistor TR232A is nonconductive and the transistor TR242A is conductive, for the instant that it takes to charge the capacitor C237A responsive to the application of ground potential thereto, the emitter electrode of the conductive transistor TR242A is biased positive with respect to the base thereof, thereby rendering the transistor TR242A nonconductive, the collector current thereof is cut off so that the collector of TR242A swings positive thereby causing a potential on the base electrode of TR232A to swing positive and to bias TR232A conductive in the base-emitter path thereof. Accordingly, the collector electrode of TR242A and the base electrode of the transistor TR240A are established at substantially ground potential whereby the emitter electrode of TR240A follows thereby establishing a potential on the marking conductor 241A at ground potential and the capacitor C237B in the switching control input circuit of the marking circuit 231B is charged. Responsive to the charging voltage being applied to the capacitor C237B, the conductive transistor TR232B therein is rendered nonconductive and the nonconductive transistor TR242B is rendered conductive, whereby the collector electrode of the latter transistor and the base electrode of the transistor TR240B are biased at substantially −48 volts and the transistor TR240B is established nonconductive. Thus, while the transistor TR240B was the only one of the output transistors TR240A, etc., to be operative prior to the operation of the pulse generator 250, at the end of the first switching control pulse the transistor TR240B is rendered nonconductive and only the transistor TR240A is conductive. In response to the second operation and restoring of the pulse relay R254 a second digit impulse is received in the primary selector 50 in order to control switching apparatus for extending a call to the distant called exchange and the operating state of the marking circuit 231A is again reversed whereby the conductive transistor TR232A is rendered nonconductive, the nonconductive transistor TR242A is rendered conductive, and the conductive transistor TR240A is rendered nonconductive. At this time then, none of the transistors TR240A, etc., are left conductive so that ground potential is removed from the base electrode of the transistor TR298 and the potential thereat is established at negative battery via the resistor 323. Accordingly, current flows in the emitter-collector path of the transistor TR298, it being of the P-N-P junction type and the emitter electrode is established at substantially battery potential, whereby current flows from ground potential via the contacts 282, the winding of the end-of-digit relay R290, contacts 293 and the emitter-collector path of TR298 to battery potential for energizing and operating the relay R290. Upon operating, the end-of-digit relay R290 interrupts at contact 291 the previously traced circuit for applying ground potential to the conductor 297 of pulse generator 250 whereby the pulse relay R254 thereof is prevented from further operation. Additionally, the relay R290 completes at contacts 292 a circuit from battery potential via the winding thereof and contacts 282 to ground potential whereby R290 is maintained operated, and interrupts at contacts 293 the emitter circuit of the transistor TR298. Further, the relay R290 interrupts at contacts 294 the circuit extending from ground potential to the base electrode of the transistor TR299 whereby the capacitor C288 is charged to negative battery through the resistor 287 and upon becoming charged established a potential on the emitter electrode of TR299 at −48 volts whereby the relay R280 is restored. At the same time, the relay R290 opens at contact 295 the circuit extending from ground potential for energizing and operating the pulse counter R230 and closes at contacts 296 the circuit for operating the motor magnet MM302 of the sequence switch 300, which is not operated at this time as it is of the operate-upon-release type. The relay R280 upon restoring opens at contacts 281 a further point in circuit extending from ground potential to the conductor 297 of the pulse generator 250 and interrupts at contacts 282 the circuit for operating the end-of-digit relay R290, whereby the latter relay restores. Further, the relay R280 opens at contacts 283 the circuit for applying ground potential to the base electrode of TR299 and closes at contacts 284 the circuit for extending battery potential in any one of the engaged contact sets of the sequence switch 300 to the base electrode of the transistor TR299 in a manner as previously explained. Further, the relay R280 opens contacts 285 for removing battery potential from the diodes D307A, etc., whereby these diodes are unblocked and prepared to transmit ground potential over the last named circuit. Thereafter, the relay R290 restores and closes contacts 291 to prepare a circuit extending from ground potential at the contacts 271 to the conductor 297 of the pulse generator 250, opens contacts 292 and closes contacts 293 to prepare a circuit for both energizing the relay R290 and for operating the transistor TR298, closes contacts 294 for completing the previously traced circuit extending from the engaged contacts of the contact bank in the sequence switch 300 and including the contacts 284 to the junction of the capacitor C288 and the resistor 287 and the base electrode of the transistor TR299; closes contacts 295 for completing the circuit extending from ground potential via contacts 273 whereby the marking circuits 231A, etc., in the pulse counter 230 are reset and are prepared to receive marking potentials from the marking conductors connected to the contact sets of the sequence switch 300; and opens contacts 296 whereby the motor magnet MM302 of the sequence switch 300 is restored and the wiper sets 301A, etc., are stepped in a counterclockwise direction from engagement with the first contacts thereof into engagement with the second contacts thereof.

Recapitulating, when the last of the output transistors TR240A, etc., is rendered nonconductive, the transistor TR298 in the control group 269 is rendered conductive, whereby the end-of-digit relay R290 is operated and the pulse generator R250 is prevented from further operation and from sending digit impulses to the primary selector 50. In this manner, two digit impulses corresponding to the first routing digit "2" are received in the primary selector 50 for controlling the switching apparatus having access to the called distant office. The end-of-digit relay R290 upon operating also acts to restore the digit relay R280 and thereby cause its own restoration, to energize the motor magnet MM302 for causing the wipers 301A, etc., of the sequence switch 300 to engage the second contacts of the contact bank, to complete the circuit for causing the pulse counter to be reset and prepared for marking in accordance with the second routing digit marked to the conductors 312A, 312B, 312C and 312D, extending from the route digit input circuit 320 to the contact bank of the sequence switch 300, and to prepare the pulse generator 250 for further operation.

Now as previously pointed out, assuming that the route digit input circuit 220 has the digit "3" marked thereto the conductors 312A and 312B are at ground potential and the conductors 312C and 312D are at battery potential whereby, and in a manner as previously explained, the marking circuits 231A, etc., in the pulse counter 230 are operated so that the output transistors TR240A, TR240B are conductive and the output transistors TR240C and TR240D (not shown) are nonconductive, and the pulse generator 250 is operated to send digit impulses to the primary selector 50 and to cause the marking circuits 231A, etc., to have their operational states switched until none of the transfer transistors TR240A, etc., are conductive.

Considering specifically the joint operation of the pulse generator 250 and the pulse counter 230, the relay R254 in the pulse generator 250 operating and restoring a first time causes a first digit impulse to be sent to the primary selector 50 and causes a switching control pulse to be sent to the marking circuit 231A, whereby the conductive transistor TR240A is rendered nonconductive and the conductive transistor TR240B remains conductive. Thereafter, the relay R254 in the pulse generator 250 operates and restores a second time to cause a second digit impulse to be sent to the primary selector 50 and a second switching control pulse to be sent to the marking circuit 231A, whereby the nonconductive transistor TR240A is rendered conductive and the conductive transistor TR240B is rendered nonconductive. Thereafter, the relay R254 in the pulse generator 250 operates and restores a third time to cause a third digit impulse to be sent to the primary selector 50 and a third switching control pulse to be sent to the marking circuit 231A, whereby the conductive transistor TR240A is rendered nonconductive. At this time, none of the transfer transistors TR240A, etc., are any longer conductive, whereupon the transistor TR298 in the control group 269 is rendered conductive, and the relay R290 is operated.

As previously explained the relay R290 upon operating prevents further operation of the pulse counter 250, resets the pulse counter 230, causes the wipers of the sequence switch 300 to engage the third contacts in the contact bank, and prepares a circuit to send the routing digit marked on the conductors 313A, 313B, 313C and 313D of the trunk 313 extending from the route digit input circuit 221. Thus, the second routing digit "3" is sent from the sender 90 and the wipers of the sequence switch 300 engage the third contacts in the contact bank. In the same manner, the third routing digit "1" is sent from the sender 90 and the wipers of the sequence switch 300 engage the fourth contacts in the contact bank; the first directory number digit "1" is sent from the sender 90 and the wipers of the sequence switch 300 engage the fifth contacts in the contact bank; the second directory number digit "2" is sent from the sender 90 and the wipers of the sequence switch 300 engage the sixth contact in the contact bank; the third directory number digit "3" is sent from the sender 90 and the wipers of the sequence switch 300 engage the seventh contacts in the contact bank; and the fourth directory number digit "4" is sent from the sender 90 and the wipers of the sequence switch 300 are stepped into engagement with the eighth contacts in the contact bank. When the control wiper 301E of the sequence switch 300 is stepped into engagement with the eighth contacts of the associated contact banks, the off normal switch 309 is operated whereby ground potential is applied via the conductor 91, the wiper 51D of the wiper set 51 and contacts 64 to the release relay R60 in the primary selector 50; whereupon the relay R60 is operated to cause a selected register-translator-sender group including the calling register 70, the translator 80 and the sender 90 to be disconnected from the primary selector 50, at contacts 61, 62, 63, 64, 65 and 66. Thereupon the calling register 70 is restored, ground potential is removed from the conductor 293 extending to the sender 90 and the calling register 70 is operated to mark itself as idle on the conductor 103 to the other finder-selector groups having access thereto. At the same time, ground potential applied at the contacts at the off normal switch 309 is extended to the junction between the resistor 275 and the winding of the start relay R270, thereby cutting off the current flow through the winding and causing R270 to restore. Upon restoring the relay R270 opens at contacts 271, the previously prepared circuit for operating the pulse generator 250 opens at contacts 272 the hold circuit for the relay R270, and opens at contacts 273 the circuit for operating the marking circuits 231A, etc., of the pulse counter 230 and for applying ground potential to the home position contact of the control wiper 301E.

When the control wiper 301E engages the eighth contact of its associated contact set at this time ground potential is extended thereover via contacts 303 (the winding of the motor magnet MM302 having battery potential thereon) whereby the latter is energized to open contacts 303 and the wipers of the sequence switch 300 are stepped into engagement with the ninth contacts of the associated contact sets. Thereupon a circuit is completed from ground potential via the control wipers 301E and contacts 303 through the motor magnet MM302 to battery potential, whereby and as previously explained the wipers of the sequence switch 300 are stepped into engagement with the home contacts thereof and the contacts of the off normal switch 309 are opened. Thus, at this time the sender 90 is released and restored and is ready to be seized along with the associated calling register 70 and translator 80 from any one of the finder-primary selector groups having access thereto.

The sender apparatus 90 described herein is not limited to operation with the binary marking voltages that are described herein but with minor changes may be made responsive to binary marking voltages which are complementary to the previously listed schedule of marking voltages wherein the digits are marked as follows:

*Table II*

| Digit value | Voltages | | | |
|---|---|---|---|---|
| | Conductor A | Conductor B | Conductor C | Conductor D |
| 1 | −48 | 0 | 0 | 0 |
| 2 | 0 | −48 | 0 | 0 |
| 3 | −48 | −48 | 0 | 0 |
| 4 | 0 | 0 | −48 | 0 |
| 5 | −48 | 0 | −48 | 0 |
| 6 | 0 | −48 | −48 | 0 |
| 7 | −48 | −48 | −48 | 0 |
| 8 | 0 | 0 | 0 | −48 |
| 9 | −48 | 0 | 0 | −48 |
| 0 | 0 | −48 | 0 | −48 |

In order to adapt the sender 90 to respond to digit markings given in accordance with Table II, it is only necessary that in the marking circuits 231A, etc., of the pulse counter 230, the switches 248A, 248B, 248C (not shown) and 248D (not shown) be switched from engagement with the contacts "A" thereof into engagement with the contacts "B" thereof and that the switch 275 in the control group 269 be switched from engagement with the contact "A" thereof into engagement with the contact "B" thereof. In this arrangement, and in contrast to the previously described arrangement, the output transistors TR240A, etc., are all rendered conductive when the marking circuits 231A, etc., are rendered operative in response to the application of ground potential at contacts 273, and, responsive to the operation of the transistors TR240A, etc., ground potential is applied via the conductor 274 to the base electrode of the transistor TR298 in the control group 269, which transistor, however, is not operative at this time because the emitter circuit thereof is incomplete. Thereafter, when the first routing digit is marked thereto and assuming, again, that the first routing digit is the digit "2," so that in accordance with the Table II ground potential is applied to the conductors 311A, 311C and 311D and battery potential is applied to the conductor 311B, the operating state of the marking circuits 231A, 231C and 231D is changed and the transistors TR240A, TR240C (not shown) and TR240D (not shown) are rendered non-conductive, whereas the operating state of the marking circuit 231B and of the transistor TR240B remains unchanged. As a result ground potential is applied to the base electrode of the transistor TR298 and TR298 is maintained nonconductive even though the emitter circuit thereof is completed at this time. The pulse generator 250 operates to cause digit impulses to be sent to the primary selector 50 and to cause corresponding switching control pulses to be sent to the switching control input of the marking circuit 231A; whereby in response to the first operation of the pulse generator 250 a digit impulse is sent to the primary selector 50 and a switching control pulse is sent to the marking circuit 231A causing the transistor TR240A thereof to be rendered conductive, the operating state of the marking circuit 231B to be changed and the transistor TR240B associated therewith to be rendered nonconductive. The pulse generator 250 proceeds then to send a second digit impulse to the primary selector 50 and to cause a second switching control pulse to be sent to the switching control input of the marking circuit 231A, whereby in response thereto the operating state of the marking circuit 231A is changed and the transistor TR240A associated therewith is rendered nonconductive. At this time, then, all the transistors TR240A, etc., are nonconductive whereby battery potential is applied via the conductor 274 to the base electrode of the transistor TR298 in the control group 269 whereby the latter transistor is rendered conductive and the end of digit relay R290 is operated. Further operation of the sender 90 is in accordance with that previously described wherein the end of digit relay R290 causes the marking circuits 231A, etc., in the pulse counter 230 to be reset with the output transistors TR240A, etc., conductive, prevents further operation of the pulse generator 250, causes the wipers of the sequence switch to be rotated in a counterclockwise direction into engagement with the next contact and prepares the circuit for sending the next digit marked on the engaged contact. After the last directory number digit has been sent and the wipers of the sequence switch 300 are stepped into engagement with the eighth contact sets thereof, the sender apparatus 90 is operated as previously described whereby a ground pulse is sent to the primary selector 50 causing the register-translator-sender group including the calling register 70, the translator 80 and the sender 90 to be disconnected from the primary selector 50 and the apparatus in the sender arrangement 90 to be restored to normal and the control wipers of the sequence switch 300 to be stepped into their home position. At this time, then, the register-translator-sender group including the sender 90 is released, restored and marked as idle to the finder primary selector groups having access thereto and is ready to be seized in order to register, translate and send another group of digit impulses.

In view of the foregoing, it is apparent that there has been provided a sender apparatus of improved arrangement that is substantially electronic and includes a counting chain for registering digits, a pulse generator for sending digit impulses and a control circuit for jointly controlling the counting chain and pulse generator.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, register-sender apparatus comprising impulse responsive means for receiving a plurality of series of incoming decimal-digital impulses; a plurality of individual binary registers, one for each of said digits; a digital-to-binary converter common to and in circuit connection with said individual binary registers and repeatedly set under the control of said impulse responsive means for successively recording each of said digits in the different binary registers in sequence; a binary-to-digital converter including a counting chain common to said individual binary registers and having a plurality of bistable circuits, a plurality of sets of binary marking conductors, each set circuit connection with, and marked under the control of the recordings in, the bistable circuits of one or more of said binary registers; second switching means for connecting the bistable circuits of said counting chain to said sets of marking conductors in sequence for parallel write-in of the corresponding binary information into said circuits; said counting chain having connected thereto pulsing means for resetting the bistable circuits of said counting chain one by one subsequent to each said writing-in and for simultaneously transmitting a series of outgoing decimal-digital impulses, and digit control means effective upon each said resetting for disabling said pulsing means and operating said switching means.

2. In a telephone system, register-sender apparatus as claimed in claim 1, wherein said binary registers comprise a first group of registers for storing in binary form a plurality of registered office-code digits and a second group of registers for storing in binary form a plurality of subsequently received subscriber-number digits; wherein there is provided means for translating each of said office codes into a set of routing digits to be transmitted by said sender, the input of said translating means being connected to said first group of binary registers; and wherein said plurality of sets of marking conductors is divided into two groups, the first group of said sets being connected to the output of said translating means and the second group of said sets being connected to said second group of registers.

3. In a telephone system, register-sender apparatus as claimed in claim 1, wherein the bistable circuits of both said counting chains are in the form of transistor triggers.

4. In a telephone system, register-sender apparatus as claimed in claim 3, wherein a semi-conductor "and" gate is interposed between said digit control means and the transistor triggers of said second counting chain so as to control said digit control means responsive to all said transistor triggers having reached their normal state incident to said resetting operation.

5. In a telephone system, register-sender apparatus as claimed in claim 1, wherein said pulsing means include a free-running transistor multivibrator.

6. In a telephone system, register-sender apparatus comprising impulse responsive means for receiving a plurality of series of incoming decimal-digital impulses; a plurality of individual binary registers, one for each of said digits; a digital-to-binary converter including a first binary counting chain common to said individual binary registers and having a plurality of bistable circuits, said bistable circuits being repeatedly set one by one under the control of said impulse responsive means for successively recording each of said digits in binary form; first switching means for connecting said bistable circuits to the different binary registers in sequence for parallel readout of said recordings into said registers; means for operating said switching means and for directly resetting said counting chain, once after each said digit under the control of said impulse responsive means; a binary-to-digital converter including a second counting chain common to said individual binary registers and having a plurality of bistable circuits, a plurality of sets of binary marking conductors, each set in circuit connection with, and marked under the control of the recordings in, one or more of said registers; second switching means for connecting the bistable circuits of said second counting chain to said sets of marking conductors in sequence for parallel write-in of the corresponding binary information into said bistable circuits; said second counting chain having connected thereto pulsing means for resetting the bistable circuits of said second counting chain one by one subsequent to each said writing-in and for simultaneously transmitting a series of outgoing decimal-digital impulses, and digit control means effective upon each said resetting for disabling said pulsing means and operating said second switching means.

References Cited in the file of this patent

UNITED STATES PATENTS

| | | |
|---|---|---|
| 1,840,132 | Roberts | Jan. 5, 1932 |
| 2,623,108 | Holden | Dec. 23, 1952 |
| 2,678,409 | Holden | May 11, 1954 |
| 2,709,771 | Dehn | May 31, 1955 |
| 2,719,250 | Six et al. | Sept. 27, 1955 |
| 2,829,257 | Root | Apr. 1, 1958 |
| 2,850,630 | Prugh | Sept. 2, 1958 |
| 2,851,534 | Bray et al. | Sept. 9, 1958 |
| 2,854,521 | Morris et al. | Sept. 30, 1958 |
| 2,865,563 | Wright et al. | Dec. 23, 1958 |